(12) United States Patent
Søgaard et al.

(10) Patent No.: US 10,215,163 B2
(45) Date of Patent: Feb. 26, 2019

(54) LIGHTNING CURRENT TRANSFER SYSTEM WITH SPARK GAP AND WIND TURBINE USING THE LIGHTNING CURRENT TRANSFER SYSTEM

(71) Applicant: Vestas Wind Systems A/S, Aarhus N. (DK)

(72) Inventors: Morten Bagger Søgaard, Arhus N (DK); Niels Thomas Bengtson, Hedensted (DK); Nicolai Tolstrup, Aarhus N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 362 days.

(21) Appl. No.: 15/031,059

(22) PCT Filed: Oct. 20, 2014

(86) PCT No.: PCT/DK2014/050342
§ 371 (c)(1),
(2) Date: Apr. 21, 2016

(87) PCT Pub. No.: WO2015/058771
PCT Pub. Date: Apr. 30, 2015

(65) Prior Publication Data
US 2016/0281687 A1    Sep. 29, 2016

(30) Foreign Application Priority Data
Oct. 21, 2013    (DK) .................................. 2013 70599

(51) Int. Cl.
*F03D 80/30*    (2016.01)

(52) U.S. Cl.
CPC ............ *F03D 80/30* (2016.05); *Y02E 10/726* (2013.01)

(58) Field of Classification Search
CPC ............................... F03D 80/30; Y02E 10/726
See application file for complete search history.

(56) References Cited

U.S. PATENT DOCUMENTS

| | | | |
|---|---|---|---|
| 6,932,574 B2 * | 8/2005 | Wobben | F03D 1/065 416/146 R |
| 7,377,750 B1 * | 5/2008 | Costin | F03D 80/30 361/220 |

(Continued)

FOREIGN PATENT DOCUMENTS

| | | | |
|---|---|---|---|
| DE | 4436197 A1 | 4/1996 | |
| DE | 4445899 A1 | 6/1996 | |

(Continued)

OTHER PUBLICATIONS

European Patent Office, International Search Report and Written Opinion issued in International Patent Application No. PCT/DK2014/050342 dated Dec. 3, 2014.

(Continued)

*Primary Examiner* — Jason D Shanske
*Assistant Examiner* — Joshua R Beebe
(74) *Attorney, Agent, or Firm* — Wood Herron & Evans LLP

(57) ABSTRACT

This invention relates to a lightning current transfer system adapted for usage in a wind turbine (W) having a hub (40) rotatably supported relative to a nacelle (50) and a plurality of pitchable blades (20) connected with the hub (20). The system (100) comprises a blade band (10) mountable to the root of the blade (10) and a lightning ring (30) mountable to the nacelle (50). The lightning ring (30) and the blade band (10) are positioned relative to each other to form a spark gap (SG) there between.

21 Claims, 4 Drawing Sheets

(56) References Cited

U.S. PATENT DOCUMENTS

| | | |
|---|---|---|
| 2003/0170122 A1 | 9/2003 | Wobben |
| 2007/0114797 A1* | 5/2007 | Krug ..................... H02G 13/00 |
| | | 290/44 |
| 2010/0188790 A1* | 7/2010 | Llorente Gonzalez ...................... |
| | | F03D 1/065 |
| | | 361/117 |
| 2016/0084232 A1* | 3/2016 | Eden ...................... F03D 80/30 |
| | | 416/146 R |

FOREIGN PATENT DOCUMENTS

| | | |
|---|---|---|
| EP | 0718495 A1 | 6/1996 |
| EP | 1036937 A2 | 9/2000 |
| EP | 2395238 A1 | 12/2011 |
| WO | 2012016568 A2 | 2/2012 |

OTHER PUBLICATIONS

Danish Patent and Trademark Office, Search Report issued in Application No. PA 2013 70599 dated Jun. 10, 2014.

* cited by examiner

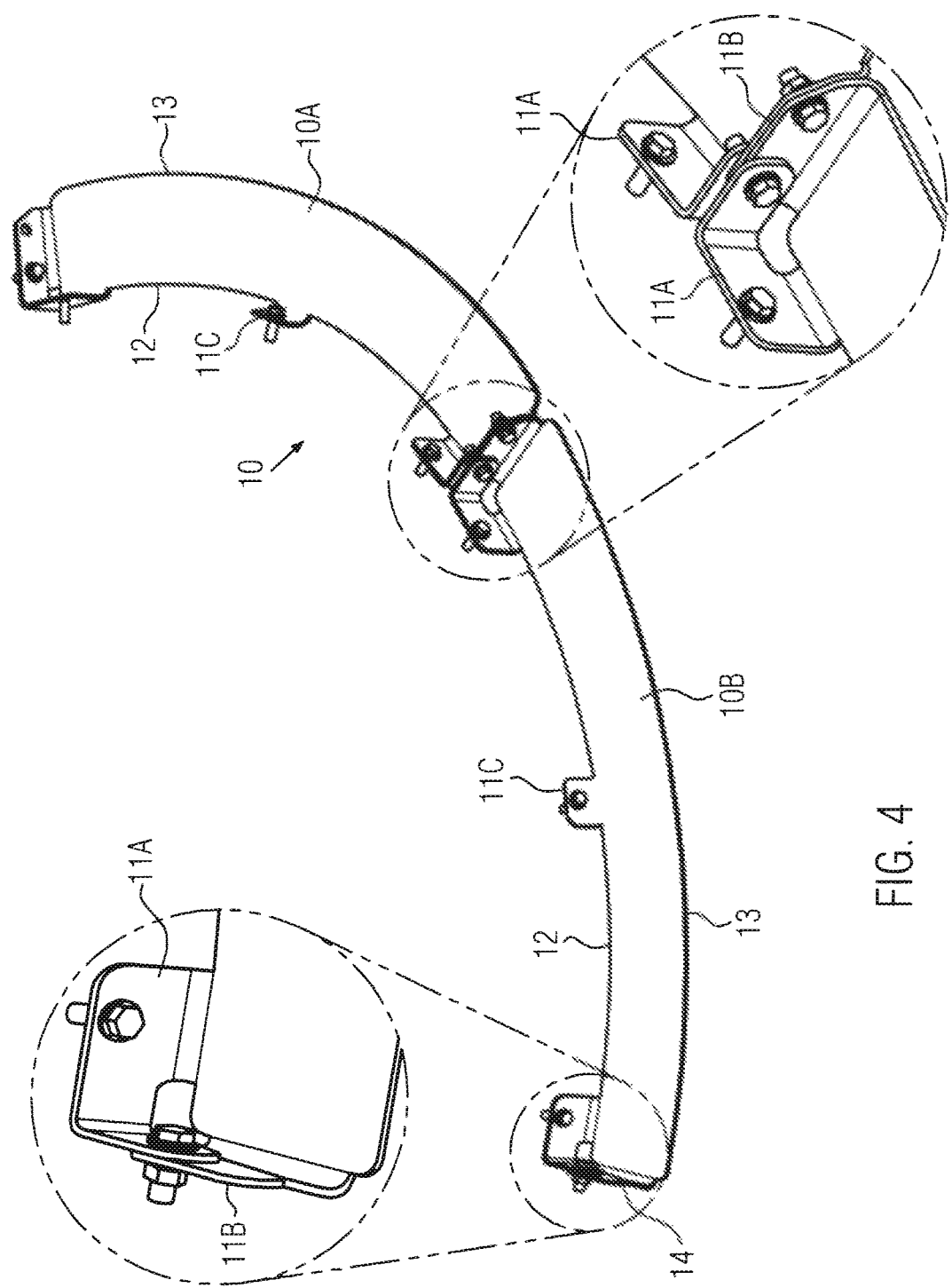

LIGHTNING CURRENT TRANSFER SYSTEM WITH SPARK GAP AND WIND TURBINE USING THE LIGHTNING CURRENT TRANSFER SYSTEM

TECHNICAL FIELD

The invention relates to a lightning current transfer system adapted for usage in a wind turbine having a hub rotatably supported relative to a generator in a nacelle of the wind turbine and a plurality of pitchable blades connected with the hub. The invention also relates to a wind turbine in which the lightning current transfer system is implemented.

DESCRIPTION OF THE RELATED ART

Due to the size, wind turbines are prone to lightning strikes. The height of wind turbines overshoots by far surrounding trees and buildings in order to efficiently convert wind power into electrical energy. If lightning strikes the tip of a blade of a wind turbine, the current flows through a down conductor to, the blade bearings, the hub, the hub bearings, the generator shaft, the generator and the tower into the ground. Due to the high current values, there is a high risk that the bearings and electrical generators are damaged by the high voltages and currents flowing through the bearings and the generators. Therefore, efforts have been made to avoid damage in the blade bearings, turbine generators and the generator shaft bearings by offering a current path with lower impedance around the sensitive areas.

For instance, JP 05/060053A suggests a lightning protection system which guides the lightning energy from the hub to the nacelle through a slip ring device so as to avoid a lightning discharge path through the shaft bearings and the generators. This slip ring device consists of a disk which is mounted at the hub and which rotates with the hub. Carbon brushes mounted at the nacelle establish an electrically conductive path between the hub and the nacelle.

This solution has, however, the disadvantage that it does not consider that in modern wind turbines, the blades are pitchable and connected to the hub through bearings in order to allow blade pitch control. These bearings may also be damaged by a high current flow.

Therefore, efforts have been made in order to provide a short, low impedance connection between the root of the blade and the nacelle.

Figure 1:
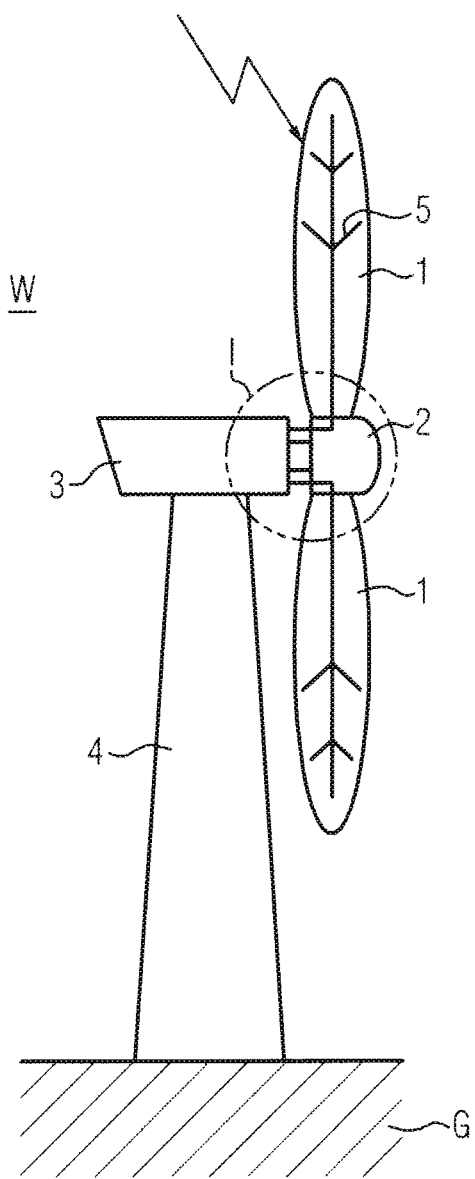
Figure 2:
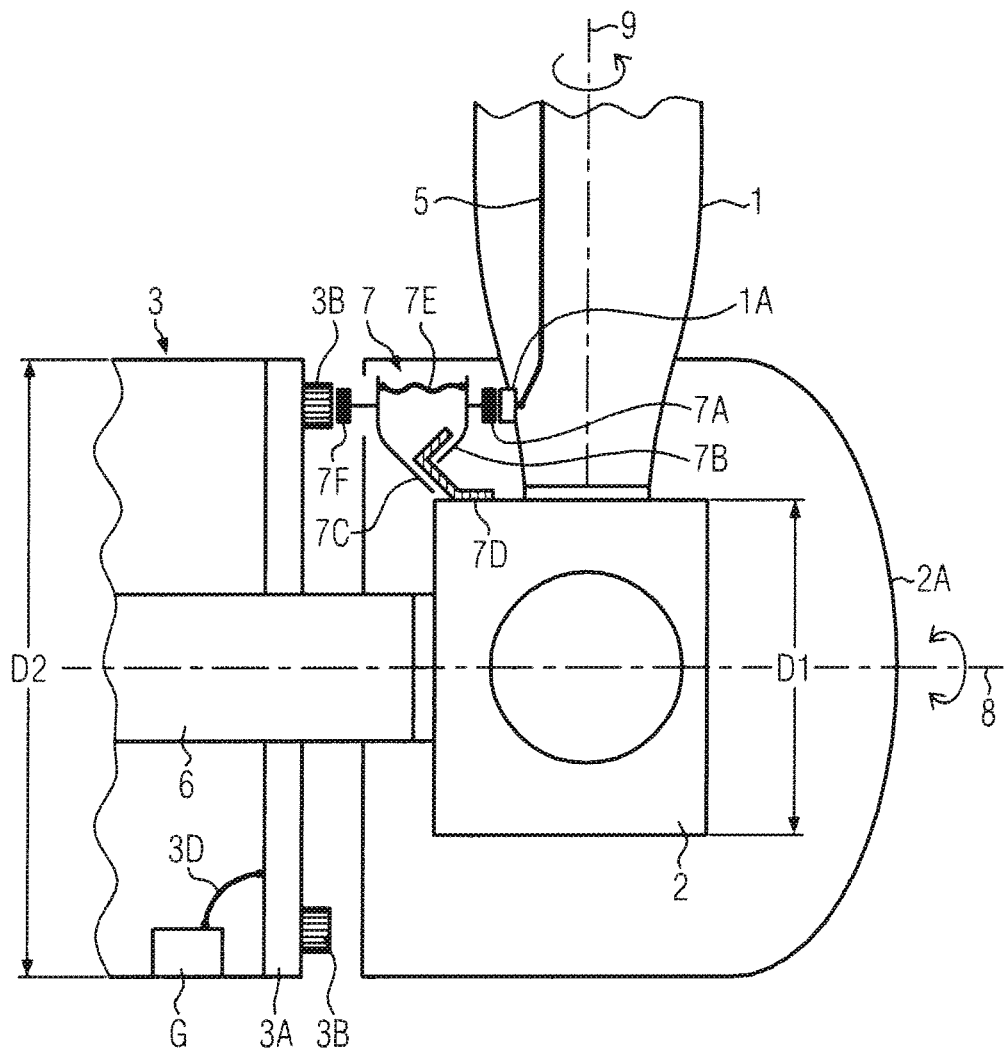

A solution for this problem is shown in the international patent application WO 2005/050008A1 disclosing a lightning current transfer unit which is collectively usable for a wide variety of turbine types. These turbines use a lightning current transfer unit (LCTU) that provides lightning current transfer from a blade band at the blade root to a nacelle lightning ring. This situation is illustrated in FIGS. 1 and 2. FIG. 1 shows a wind turbine W with a nacelle 3 containing the generator (not shown) sitting on the wind turbine tower 4. The blades 1 supported by the hub 2 are connected through a generator shaft with the turbine generators in the nacelle 3. Within the blade 1, a blade lightning protection system 5 is provided in form of thick conductive cables guiding the lightning power through the blades to the root of the blades 1. From there, the lightning current is transferred via the hub 2, the nacelle 3, and the tower 4 into ground G.

FIG. 2 shows a more detailed view of the encircled section I in FIG. 1. In FIG. 2, reference numeral 1 designates a blade, numeral 2 designates the hub, numeral 2A designates the spinner (the cover/housing of the hub), numeral 3 designates the nacelle, numeral 3A designates the front plate of the nacelle and reference numeral 6 designates the generator shaft which connects the hub 2 with the generator (not shown) in the nacelle 3. The lightning current transfer unit comprises a blade band 1A that is mounted at the root of the blade 1 and which is connected with the cables of the blade lightning protection system 5. Moreover, the LCTU comprises a lightning ring 3B which is mounted at the nacelle front plate 3A. The hub 2 is relatively small compared to the nacelle 3 so that the blade band 1A and the nacelle lightning ring 3B are positioned to face each other. That is, the diameter D1 of the hub 2 is smaller than the diameter D2 of the nacelle 3 so that the blade band 1A can rotate inside of the nacelle perimeter dimensions D2. This dimensional relationship allows the positioning of a compact connecting device 7 which electrically connects the blade band 1A which is rotatable around a blade axis 9, and the nacelle lightning ring 3B which rotates relative to the connecting device 7 around the hub axis 8. The hub 2 and the connecting device 7 are collectively enclosed by a cover to which it is referred as the spinner 2A.

The connecting device 7 in FIG. 2 comprises a bracket 7D, to which one end of two fiber glass profiles 7B and 7C are mounted. At the other ends of the fiber glass profiles 7B and 7C, contact elements 7A and 7F are mounted respectively. A cable 7E connects the contact elements 7A and 7F. It has to be noted that FIG. 2A shows a small gap between contact elements 7A/7F and blade band 1A and lightning ring 3B, respectively, for illustration purposes. In operation, these contacts are sliding contacts. Bending forces of the fiber glass profiles 7B and 7C push the contact elements 7A and 7F against the blade band 1A and the lightning ring 3B to ensure a low impedance connection between the blade 1 and the nacelle 3 even if contact element 7F is rotating relative to the lightning ring 3B around axis 8 and the blade band 1A is rotating relative to the contact 7A around axis 9. When lightning strikes a blade 1, the lightning current is guided through the cable 5 of the blade lightning protection system to the blade band 1A, through the contact 7A, the connection cable 7E, the contact element 7F to the lightning ring 3B which is mounted to the nacelle front plate 3A which is grounded through a cable 3D with ground G.

In summary, WO 2005/050008A1 suggests a lightning current transfer system that uses sliding point contacts in order to transfer the lightning current from pitching blades through a rotating hub into a grounded nacelle. The sliding point contacts are subjected, however, to mechanical wear.

It is therefore an object of this invention to provide a lightning current transfer system that avoids the problem of damaging point contacts due to electrical and mechanical wear and secures at the same time a defined lightning current path from a blade to a nacelle of a wind turbine.

SUMMARY OF INVENTION

The object is achieved by a lightning current transfer system as claimed in claim 1.

More particularly, the object is achieved by a lightning current transfer system adapted for usage in a wind turbine having a hub that is rotatably supported relative to a nacelle, and a plurality of pitchable blades connected with the hub. The system comprises a blade band mountable to the root of the blade and a lightning ring mountable to the nacelle. The lightning ring and the blade band are positioned relative to each other to form a spark gap therebetween.

This configuration of a lightning current transfer system allows a defined lightning current transfer path from a pitchable blade of a wind turbine to the nacelle without using a point contact so that these point contacts can not become damaged due to mechanical wear or due to high current flow. The spark gap is designed to ensure a controlled flash over from the blade band to the lightning ring.

An initiation of a flash over may be facilitated by an edge provided at the blade band whereby the edge is formed at or protrudes from the blade band so as to face the lightning ring. By means of the edge, the electric field strength in case of lightning current is concentrated at the edge so as to stimulate ionization of air at the edge.

In one embodiment, the blade band comprises a flat band of metal having two short edges, a curved inner edge and a curved outer edge so that the curved outer edge of the blade band can face the lightning ring and the curved inner edge can face the blade. By this configuration, the distance between the blade band and the lightning ring is made smaller. Moreover, by this configuration of the blade band, a small edge of the blade band faces the lightning ring to increase the electrical field strength between the blade band and the lightning ring in case that lightning strikes the blade. This increases the likelihood that the flashover between the blade band and the lightning ring takes place at the smallest distance between the blade band and the lightning ring so that there is a better control of the lightning current transfer path.

In a further embodiment of this invention, the blade band comprises at least two flat band segments mounted together at one of their short edges. Splitting the blade band into several segments facilitates maintenance of the blade band. For instance, if a part of the blade band has been damaged due to a flashover from the blade band to the lightning ring (nacelle ring), only a part of the blade band having a lower weight has to be exchanged.

In one embodiment, a contour of the curved inner edge of the blade band is adapted to follow an outer circumferential contour of the blade. Accordingly, in the case that the root of the blade has a cross-sectional shape of a circle, the flat band of metal may have the form of a ring segment. However, any other cross-sectional shapes for the blade are possible and the contour of the curved inner edge of the blade band has to be adapted accordingly.

In another embodiment, a contour of the curved outer edge of the blade band is adapted to substantially maintain a predetermined distance to the lightning ring substantially independent of the rotational position of the blade and the hub relative to the nacelle, thereby forming the spark gap. Conventionally, the contour of the curved outer edge has a shape of a segment of a circle reflecting the rotational properties of the blade and the hub. However, in case that the blade band is not mounted coaxially with the blade rotation axis, the outer contour of the blade band may have a different shape and might be not circular.

In one embodiment, the flat band of metal may span in total an angle range of 90 degrees to 150 degrees. In case of two or more flat band segments, each flat band segment may span an angle range of 45 degrees to 75 degrees.

In another embodiment, the short edges of the flat band of metal are bent to protrude perpendicularly from the plane of the flat band of metal thereby forming a strengthening portion of a corner of the flat band of metal.

In a further embodiment, the curved inner edge of the flat band of metal is provided with mounting portions that protrude perpendicularly from the plane of the flat band of metal, the mounting portions being adapted for fixing the blade band to the hub. The blade band may comprise at least three mounting portions, wherein each of the outer mounting portions are mechanically connected with an adjacent strengthening portion. The three mounting portions ensure a stable connection of the blade band with the blade by means of a three-point fixture. In order to improve the stability of the fixture, each of the three mounting portions are provided with a mounting bore, wherein a distance between the mounting bore of the outer mounting portions and the plane of the flat band of metal is different to the distance between the mounting bore of a middle mounting portion and the plane of the flat band of metal. Thus, the three-point fixture in the form of a triangle can be achieved which further improves stability of the blade band which protrudes from the blade surface. Also connecting the outer mounting portions with the adjacent strengthening portion by bending the corners of the flat band of metal together and bolting them in place improves the stability of the blade band and makes the corners stronger.

In one embodiment, the strengthening portion and the mounting portions are integrally formed with the flat band of metal. In another embodiment, the strengthening element, the mounting portions and the flat band of metal are formed of one piece of metal. The metal should be electrically conductive and mechanically stable. If stability is preferred, steel or stainless steel may be used as the sheet of metal. In case that high conductivity is preferred, copper, aluminum or an alloy thereof may be used. Also a combination of these metals, for instance, by laminated structures, are possible to achieve a combination of high conductivity and high stability. In order to achieve a high stability and also to ensure that lightning does not melt a large hole in the edge of a section of the blade band, the sheet of metal may have a thickness of 3-7 mm and more preferably, a thickness of 4-5 mm.

In another aspect of this invention, a wind turbine is provided which comprises a hub that is rotatably supported relative to a generator in a nacelle, a plurality of pitchable blades that are connected with the hub and a lightning current transfer system for transferring lightning current from the blade to the nacelle, as outlined above.

SHORT DESCRIPTION OF THE FIGURES

Figure 3A:
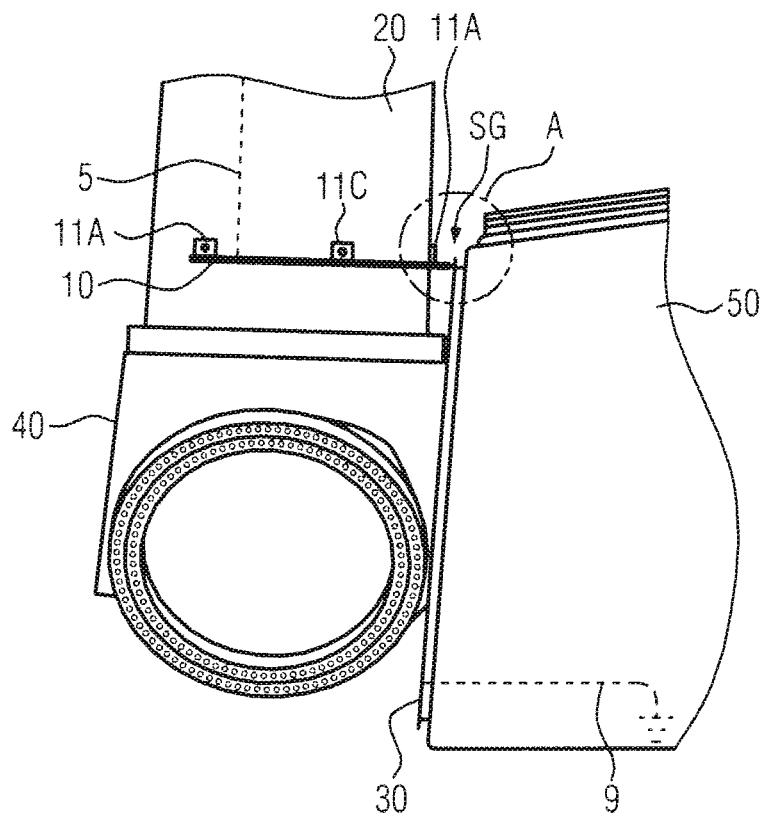
Figure 3B:
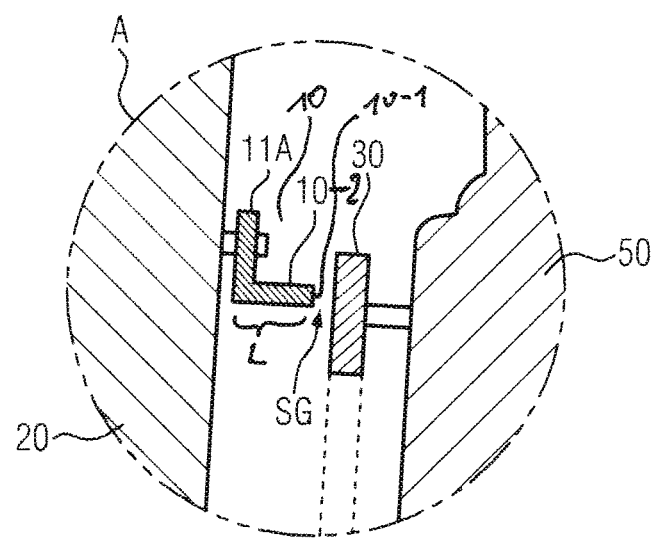

In the following, embodiments, examples, advantages and implementations of the invention will be explained in more detail by means of the accompanying figures. It is noted that all described and/or illustrated features alone or in arbitrary combination are basically subject matter of the invention, independently of the summary in the claims or the references in the claim. Also, the content of the claims is considered to be part of the description. In the figures show FIG. 1: Schematically a wind turbine;

FIG. 2: An enlarged view of the region I of FIG. 1 according to the state of the art;

FIG. 3A: Schematically the lightning current transfer system according to the present invention;

FIG. 3B: An enlarged view of the lightning current transfer system according to the encircled region A of FIG. 3A; and FIG. 4: A schematic 3-dimensional view of a blade band according to the present invention.

DETAILED DESCRIPTION OF EMBODIMENTS

This invention has been made to provide a lightning current transfer system for a wind turbine that avoids problems of point electrodes which can become damaged due to flashovers and mechanical wear.

In the following, same reference numerals designate the same technical features in the figures and an omitted description of a particular reference number may be found in a description of a previous figure. Moreover, the dimensions and proportions in the figures have only illustrative character and are not intended to reflect a scale model.

FIG. 3A shows an overview of the lightning current transfer system using a spark gap. In FIG. 3A, reference numeral 20 designates the root part of a blade, reference numeral 40 designates a hub, reference numeral 50 designates a nacelle, reference numeral 30 designates a lightning ring mounted to the nacelle 50 and reference numeral 10 designates a blade band. The blade band 10 is mounted to the blade 10 via mounting portions 11A and 11C. The lightning ring 30 is connected via a cable 9 to the ground. The blade band 10 is connected to cabling 5 which guides the lightning current from the tip of the blade 20 to the blade band 10. The hub 40 is rotationally supported relative to the nacelle 50 and the lightning ring 30. The rotational energy of the rotor comprising the hub 40 and the blade 20 transmits rotational energy to a generator within the nacelle 50, for instance, directly (direct drive) or indirectly via a gearbox which might be directly connected to the hub 40 or may be interposed anywhere else between the hub 40 and the generator (not shown). FIG. 3A shows a hub 40 with only one mounted blade 10. The big circle at the hub 40 illustrates the blade bearing which is visible in FIG. 3A as the blade is not mounted thereon. The blade band 10 does not directly contact the lightning ring 30 (nacelle ring). The blade band 10 and the lightning ring 30 are arranged so as to define a gap SG (spark gap) therebetween. The spark gap SG has a width that allows a defined flash over between the blade band 10 and the nacelle ring 30 independent of the rotational position of the hub 40 and the blade 20 in the case of a lightning strike into the blade and the associated high voltage at the blade root (the high voltage being between the blade lightning protection system and the voltage potential at the hub). The hub 40 rotates relative to the nacelle 50. The blade 20 is rotatable around a longitudinal axis of the blade 20 relative to the hub 40. The rotational movement of the blade 20 is, however, limited in most cases to less than 150 degrees. To this rotational movement of the blade 20, it is referred to as pitching. Accordingly, the blade band does not completely surround the blade 20, but is adapted to the pitch range. Generally, this invention is also directed to wind turbines having a pitch control.

If a lightning strikes a blade, the lightning current is guided through the cable 5 within the blade 20 to the blade band 10. The high voltages of the lightning lead to a flashover at the spark gap SG so that a controlled low impedance connection between the blade band 10 and the lightning ring 30 is formed. The lightning current is thus guided from the blade band 10 to the lightning ring 30 from where it is guided to the ground by cables 9.

FIG. 3B shows an enlarged view of the encircled region A of FIG. 3A. FIG. 3B shows a cross-section of the blade 20, the nacelle 50, the blade band 10 and the lightning ring 30. The lightning ring 30 is bolted to the nacelle 50 and the blade band 10 is bolted to the blade 20 by means of mounting portion 11A. The dotted line in FIG. 3B at the lightning ring 30 indicates the ring structure which is not visible in the cross section. The blade band 10 comprises an edge 10-1 formed at or protruding outward from the blade band 10 so as to face the lightning ring 30. The edge may facilitate initiating a controlled flash over from the blade band 10 to the lightning ring 30. The blade band 10 may be implemented by a flat band of metal 10-2 having mounting portions 11A with which the flat band 10-1 is mounted to the blade 20. The width L of the flat band 10-2 of metal is configured to bridge the distance between the blade 20 and the lightning ring 30 so as to form a spark gap SG having a defined distance in a predefined range for instance in a range of 10 mm to 50 mm or more preferred 20 mm to 30 mm. Conventionally, a medium distance of 24 mm is used. In FIG. 3B, the mounting element of the blade band 10 is illustrated as being integrally formed with the flat band of metal to form an integral bracket in order to improve mechanical stability.

FIG. 4 shows more details of the blade band 10. FIG. 4 shows the blade band in the form of two segments 10A and 10B. Each of them are implemented by a flat band of metal having a curved inner edge 12, a curved outer edge 13, short edges 14, mounting portions 11A and 11C, and strengthening portions 11B. The curved inner edge 12 is intended to face the blade and is adapted to follow the outer contour of the blade. The curved outer edge 13 is adapted to maintain a constant spark gap between the blade band 10 and the lightning ring 30. Conventionally, the contour of the inner edge 12 and the contour of the outer edge 13 are of circular shape so that each segment 10A and 10B of the blade band 10 has the shape of a ring segment. However, other shapes are possible depending on the contour of the blade and the geometrical arrangement of the blade band and the lightning ring. For instance, a non-circular cross-section of the blade or a non-coaxial arrangement of the blade band relative to a blade axis may require non-circular contours of the curved edges of the blade band. Moreover, the contour of the curved outer edge 13 may also be corrugated or saw-toothed in order to introduce sharper edges so as to allow locally increasing the field strength at the blade band edge facing the lightning ring in case that lightning strikes the wind turbine blade. Thus, flash over is facilitated at defined locations.

The mounting portions 11A and 11C may be implemented by, for instance, protrusions at the flat band of metal which are bent so that mounting brackets are formed. Each mounting portions 11A and 11C include a mounting bore. Preferably, each blade band segment comprises three mounting portions, namely two outer mounting portions 11A and one middle mounting portion 11C. In some embodiments, the mounting bores may be positioned at two different heights with regard to the plane level of the flat band of metal. The short edges 14 of the flat band of metal are provided with strengthening portions 11B which may be implemented by bending the short edges 14 of the flat bands of metal. A further strengthening is achieved if the outer mounting portion 11A and the strengthening portion 11B are bent together and bolted in place as illustrated in FIG. 4. Moreover, the strengthening portions 11B may also be used to mount two blade band segments 10A and 10B together, for instance, by means of bolts. In some embodiments, the blade bands may be made of a sheet of steel having a thickness of 4-5 mm to ensure that lightning does not melt a large hole on the edge of a segment.

Moreover, in some embodiments the blade band 10 is made of two segments 10A and 10B which cover in total an angle of 115 degrees on the blade. However, other angle ranges are possible depending on the pitching range of the blade. By splitting the blade band into two or more segments, the weight of each part/segment of the blade band 10 can be decreased, for instance, to a weight of 7.2 kg per segment so that maintenance is facilitated. Another advantage of using a blade band as described above is that the gutter and the front lightning ring that are mounted to the nacelle may be used from existing wind turbine types and need not to be changed.

The blade band exemplified in FIGS. 3 and 4 is constructed as a flat band of metal having mounting portions integrated therein. The blade band may also be implemented in form of an L-shaped profile including a curved edge or a U-shaped profile including a curved edge that are mountable to the blade so that the curved edge faces the lightning ring.

The invention claimed is:

1. A lightning current transfer system adapted for usage in a wind turbine having a hub rotatably supported relative to a nacelle and a pitchable blade connected with the hub, said system comprising:
a blade band adapted to be mounted to a root of the blade; and
a lightning ring adapted to be mounted to the nacelle;
wherein the lightning ring and the blade band are positioned relative to each other to form a spark gap there between when the blade band is mounted to the root of the blade and the lightning ring is mounted to the nacelle.

2. The lightning current transfer system according to claim 1, wherein the blade band comprises an edge formed at or protruding from the blade band and facing the lightning ring.

3. The lightning current transfer system according to claim 2, wherein the edge is configured for initiating a flash over between the blade band and the lightning ring in case of a lightning strike.

4. The lightning current transfer system according to claim 1, wherein the blade band comprises a flat band of metal having two short edges, a curved inner edge and a curved outer edge so that the curved outer edge of the blade band can face the lightning ring and the curved inner edge can face the blade.

5. The lightning current transfer system according to claim 4, wherein a contour of the curved inner edge of the blade band is adapted to follow an outer circumferential contour of the blade.

6. The lightning current transfer system according to claim 4, wherein a contour of the curved outer edge of the blade band is adapted to substantially maintain a predetermined distance to lightning ring substantially independently of the rotational position of the blade and the hub relative to the nacelle, thereby forming the spark gap.

7. The lightning current transfer system according to claim 4, wherein the flat band of metal has the form of a ring segment.

8. The lightning current transfer system according to claim 4, wherein flat band of metal spans in total an angle range of 90° to 150°.

9. The lightning current transfer system according to claim 4, wherein the short edges of the flat band of metal are bent to protrude perpendicularly from the plane of the flat band of metal thereby forming a strengthening element of a corner of the flat band of metal.

10. The lightning current transfer system according to claim 4, wherein the curved inner edge of the flat band of metal is provided with mounting portions that protrude perpendicularly from the plane of the flat band of metal, the mounting portions being adapted for fixing the blade band to the root of the blade.

11. The lightning current transfer system according to claim 10, wherein the mounting portions comprise a middle mounting portion and two outer mounting portions, wherein each of the outer mounting portions are mechanically connected with an adjacent strengthening portion.

12. The lightning current transfer system according to claim 11, wherein the middle mounting portion and the two outer mounting portions are provided with a mounting bore, wherein a first distance between the mounting bore in each of the outer mounting portions and the plane of the flat band of metal is different from a second distance between the mounting bore in the middle mounting portion.

13. The lightning current transfer system according to claim 4, wherein the strengthening portion and the mounting portions are integrally formed with the flat band of metal.

14. The lightning current transfer system according to claim 4, wherein the strengthening portion, the mounting portions and the flat band of metal are formed of one piece of metal.

15. The lightning current transfer system according to claim 1, wherein the blade band comprises at least two flat band segments, each flat band segment having at least one short edge, the at least two flat band segments being mounted together at the at least one short edge of the at least two flat band segments.

16. The lightning current transfer system according to claim 15, wherein each flat band segment spans in total an angle range of 45° to 75°.

17. The lightning current transfer system according to claim 1, wherein the blade band is made of a sheet of metal having a thickness of 3-7 mm.

18. The lightning current transfer system according to claim 17, wherein the metal is steel, stainless steel, copper, aluminum or an alloy thereof.

19. A wind turbine comprising:
a hub rotatably supported relative to a nacelle and a pitchable blade connected with the hub; and
a lightning current transfer system comprising:
a blade band mounted to a root of the blade; and
a lightning ring mounted to the nacelle;
wherein the lightning ring and the blade band are positioned relative to each other to form a spark gap there between.

20. The wind turbine according to claim 19, wherein the blade band comprises an edge formed at or protruding from the blade band and facing the lightning ring, the edge being configured for initiating a flash over between the blade band and the lightning ring in case of a lightning strike.

21. The wind turbine according to claim 19, wherein:
the blade band comprises a flat band of metal having two short edges, a curved inner edge and a curved outer edge, and
the blade band is mounted at the root of the blade so that the curved outer edge of the blade band faces the lightning ring and the curved inner edge faces the blade.

* * * * *